(12) United States Patent
Zipse et al.

(10) Patent No.: US 10,046,495 B2
(45) Date of Patent: Aug. 14, 2018

(54) MULTI-COMPONENT INJECTION-MOLDING MACHINE HAVING A ROTATABLE CENTER PART

(71) Applicant: Ferromatik Milacron GmbH, Malterdingen (DE)

(72) Inventors: Rolf Zipse, Emmendingen (DE); Thorsten Thümen, Bensheim (DE)

(73) Assignee: Ferromatik Milacron GmbH, Malterdingen (DE)

( * ) Notice: Subject to any disclaimer, the term of this patent is extended or adjusted under 35 U.S.C. 154(b) by 0 days.

(21) Appl. No.: 15/049,598

(22) Filed: Feb. 22, 2016

(65) Prior Publication Data

US 2016/0167274 A1 Jun. 16, 2016

Related U.S. Application Data

(63) Continuation of application No. PCT/EP2014/002281, filed on Aug. 20, 2014.

(51) Int. Cl.
*B29C 45/04* (2006.01)
*B29C 45/32* (2006.01)
(Continued)

(52) U.S. Cl.
CPC ........ *B29C 45/2681* (2013.01); *B29C 45/045* (2013.01); *B29C 45/0441* (2013.01);
(Continued)

(58) Field of Classification Search
CPC .............. B29C 45/045; B29C 45/1628; B29C 45/1761; B29C 45/2681; B29C 2045/326
See application file for complete search history.

(56) References Cited

U.S. PATENT DOCUMENTS 5,773,049 A    6/1998   Kashiwa
6,139,305 A * 10/2000   Nesch .................. B29C 45/045
                                                     264/255

(Continued)

FOREIGN PATENT DOCUMENTS

DE    10 2005 016 239 A1   10/2006
DE    10 2011 118970 A1     5/2013
(Continued)

OTHER PUBLICATIONS

International Search Report, dated Nov. 17, 2014, with Written Opinion for corresponding International Application No. PCT/EP2014/002281.

*Primary Examiner* — James P Mackey
(74) *Attorney, Agent, or Firm* — Myers Wolin, LLC

(57) ABSTRACT

In a three-plate injection-molding machine comprising a nozzle plate, a movable second mold clamping plate, a movable end plate, a closing unit that acts between the end plate and the second mold clamping plate, and a turning unit arranged between the nozzle plate and the second mold clamping plate, rails extend between the nozzle plate and the end plate. The mold-half carrier of the turning unit is supported on a support structure so that it can be rotated about an axis transverse to the machine axis, which support structure forms the abutment for the mold-half carrier rotary drive. The weight of the support structure and mold-half carrier of the turning unit is transferred into the machine bed by means of linear guides, and a substantial part of the reaction torque applied to the support structure is transferred to one of the rails by means of one supporting guide.

11 Claims, 3 Drawing Sheets

(51) Int. Cl.
  *B29C 45/26* (2006.01)
  *B29C 45/16* (2006.01)
  *B29C 45/17* (2006.01)
  *B29C 45/66* (2006.01)
  *B29C 45/67* (2006.01)

(52) U.S. Cl.
  CPC ...... *B29C 45/1628* (2013.01); *B29C 45/1742* (2013.01); *B29C 45/1761* (2013.01); *B29C 45/661* (2013.01); *B29C 45/67* (2013.01); *B29C 2045/1685* (2013.01); *B29C 2045/326* (2013.01)

(56) References Cited

U.S. PATENT DOCUMENTS 7,670,125 B2 * 3/2010 Armbruster ........... B29C 45/006
 264/241
8,764,434 B2 * 7/2014 Armbruster ........... B29C 45/045
 425/574

FOREIGN PATENT DOCUMENTS

| EP | 0 895 848 B1 | 1/2003 |
|----|---|---|
| JP | 2011 031535 A | 2/2011 |
| WO | 2005/077637 A1 | 8/2005 |
| WO | 2011/107395 A1 | 9/2011 |

\* cited by examiner

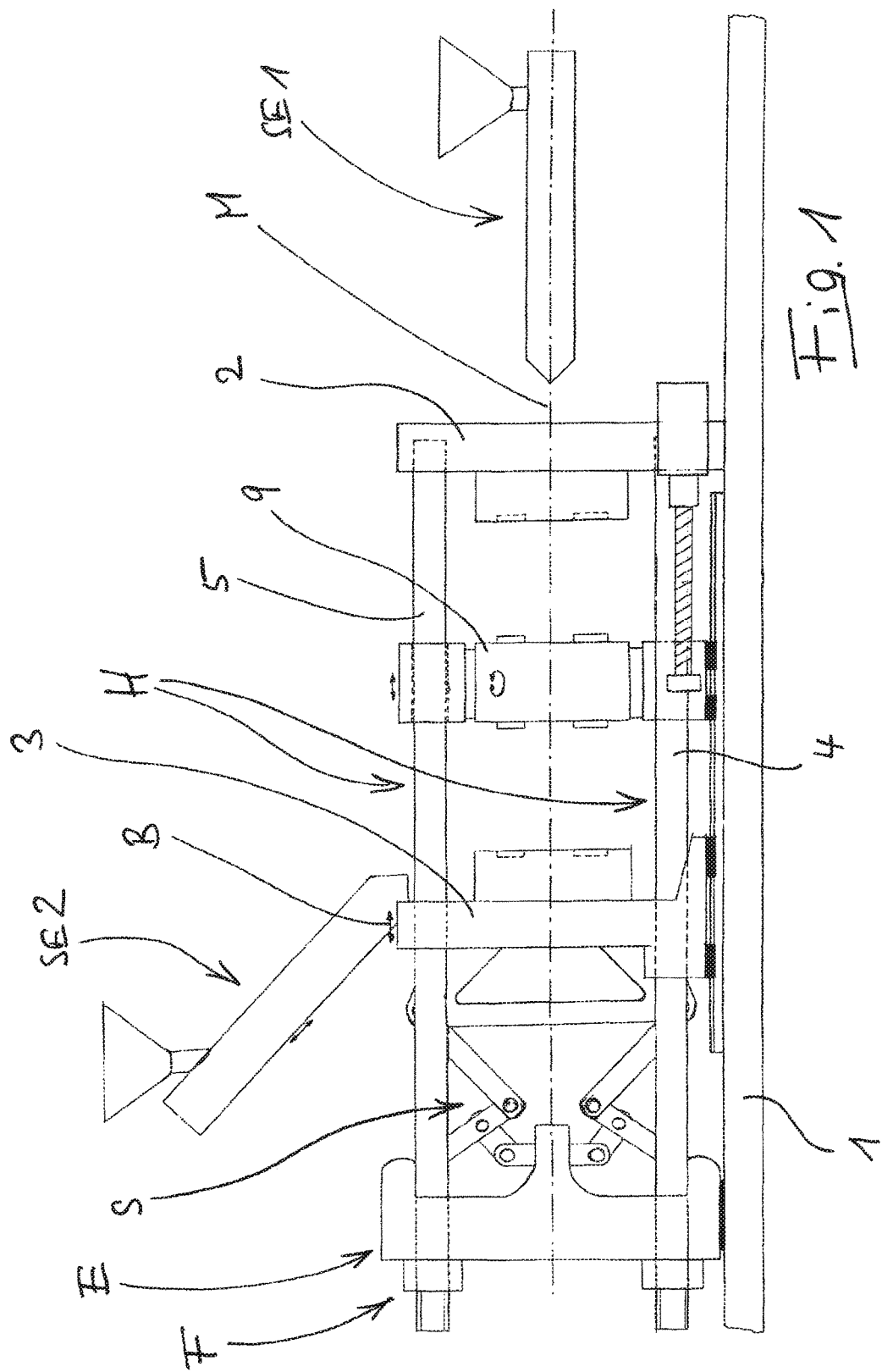

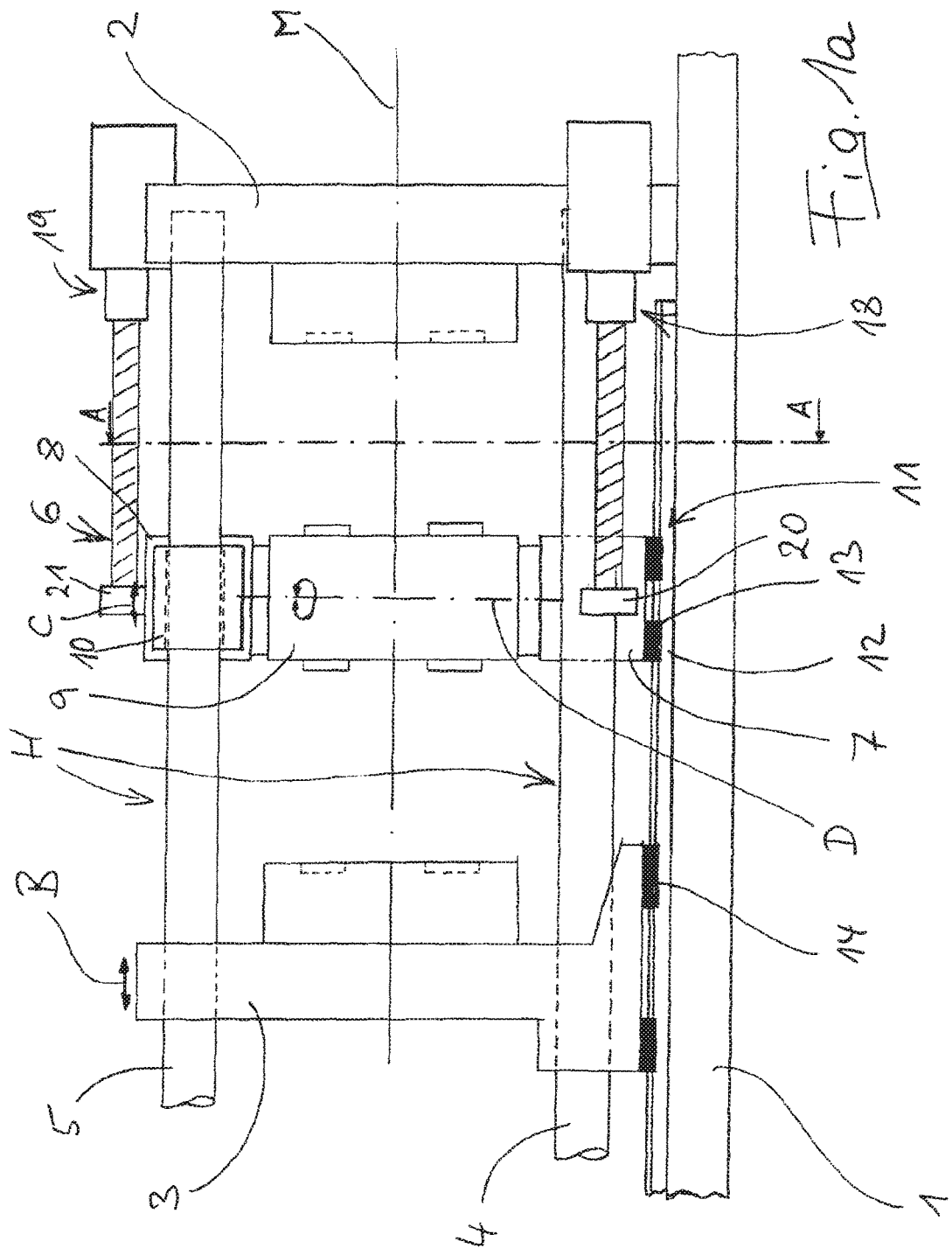

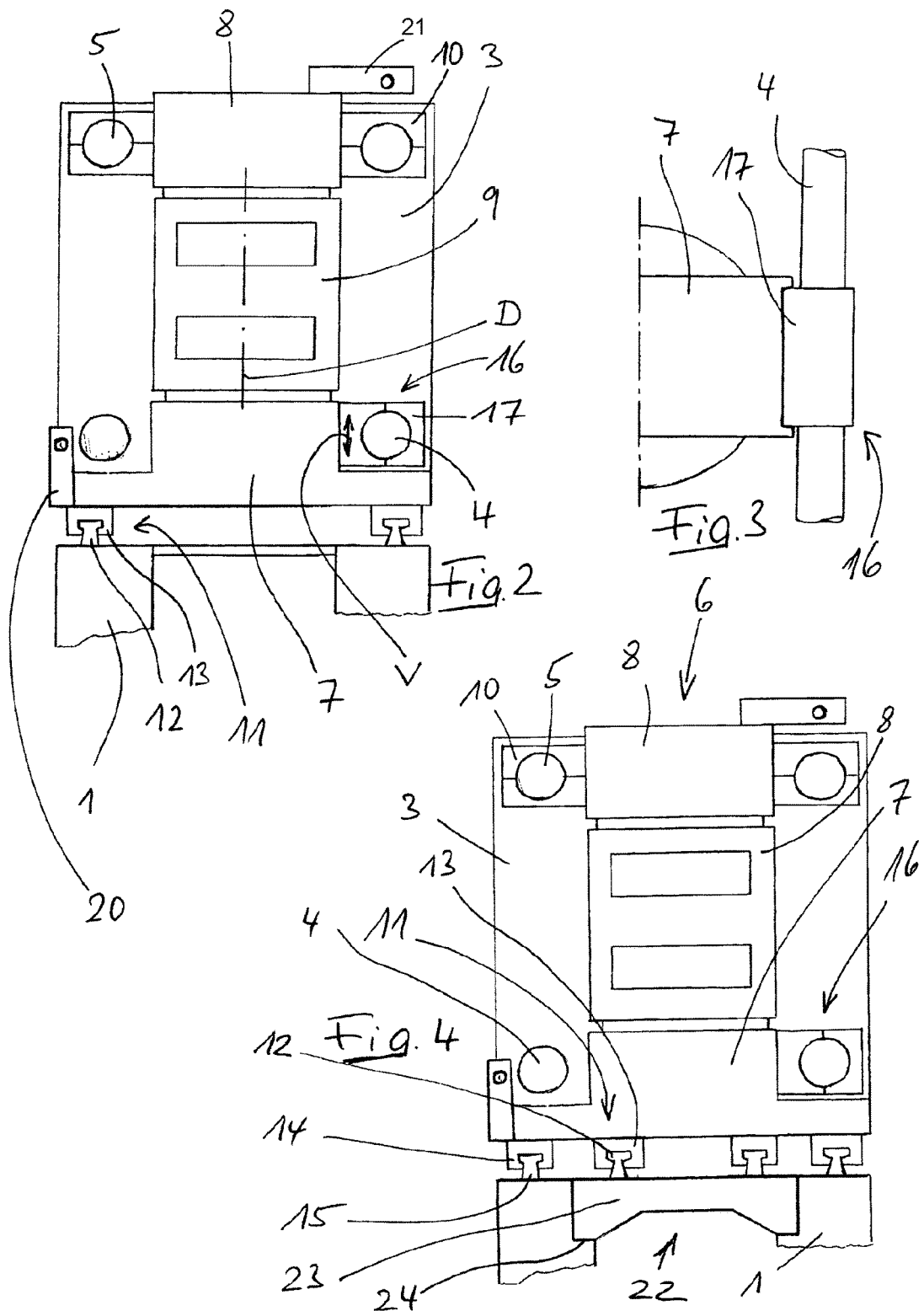

MULTI-COMPONENT INJECTION-MOLDING MACHINE HAVING A ROTATABLE CENTER PART

CROSS REFERENCE TO RELATED APPLICATIONS

This application is a continuation under 35 U.S.C. § 120 of International Application PCT/EP2014/002281, filed Aug. 20, 2014, which claims priority to German Application 10 2013 013 738.1, filed Aug. 21, 2013, the contents of each of which are incorporated by reference herein.

FIELD OF THE INVENTION

The present invention relates to an injection-molding machine in three-plate design with a machine bed, a first mold-clamping plate, which is provided with a nozzle penetration (nozzle plate) and with which a first injection unit is associated, an end plate, a second mold-clamping plate, which can be moved parallel to the machine axis, is braced via a closing assembly against the end plate and with which a second injection unit is associated, a plurality of bars extending between the nozzle plate and the end plate and a turning unit, which comprises a mold-half carrier and is disposed between the nozzle plate and the second mold-clamping plate.

BACKGROUND

Injection-molding machines of the design explained in the foregoing are known in various embodiments, for example from EP 0895848 B1 as well as WO 2005/077637 A1. They are used in particular for multi-component injection molding. The feature according to which a particular plate (e.g. the second mold-clamping plate) is associated with an injection unit (e.g. a second injection unit) corresponds to a functional assignment, to the effect that, by means of the injection unit in question, plastic melt is injected into a mold cavity, which is bounded in some zones by precisely the partial die clamped onto the plate in question. Depending on the product to be manufactured, several injection units (especially second injection units) may then also be associated with the mold-clamping plate (especially the second mold-clamping plate) in question in the present case, so that in particular the feature according to which a second injection unit is provided can be understood in the present case in the sense of at least one second injection unit. Several turning units may also be provided between the nozzle plate and the second mold-clamping plate (see WO 2005/077637 A1). Accordingly, the feature according to which a turning unit is provided can be understood in the present case in the sense of at least one turning unit.

Furthermore, injection-molding machines in two-plate design (see DE 102005016239 A1) suitable for multi-component injection molding are known, in which both mold-clamping plates, one of which is of two-piece construction, can be moved relative to a mold-half turning device. This mold-half turning device comprises a base plate, which is disposed in locally fixed relationship on the machine bed, and on which a turntable supporting the mold-half carrier is mounted to rotate around the vertical axis. In an alternative configuration, only the mold-clamping plate of two-piece construction can be moved along the machine axis, while in contrast the one-piece mold-clamping plate is braced in locally fixed relationship on the machine bed. In this configuration, the base plate of the mold-half turning device is guided displaceably on linear guides parallel to the machine axis. On each of the two upper bars of the injection-molding machine extending between the two mold-clamping plates, a yoke is guided that receives a pivot pin of the mold-half carrier, through which media is supplied to the mold-half carrier.

SUMMARY

The object of the present invention is to provide an injection-molding machine of the three-plate design mentioned in the introduction, which is characterized by a particularly high degree of practical utility, i.e. it satisfies the requirements typically imposed on such injection-molding machines used to perform multi-component injection-molding processes particularly well.

The object according to the present invention as mentioned in the foregoing is achieved by an injection-molding machine of the three-plate design mentioned in the introduction, in which the end plate is braced on the machine bed such that it can be displaced along the machine axis and the mold-half carrier is mounted on a support structure to rotate around an axis of rotation oriented transversely relative to the machine axis, the said support structure forming the abutment for the mold-half-carrier rotary drive, wherein the weight of the support structure and of the mold-half carrier of the turning unit is transferred via linear guides directly from the support structure into the machine bed and at least a substantial part of the reaction torque exerted on the support structure during rotational acceleration of the mold-half carrier is transferred via bracing guides into at least one of the bars. In other words, a quite specific dissipation of the loads, forces and torques occurring during operation is characteristic of the inventive injection-molding machine, namely to the effect that the weight at least of the support structure and of the mold-half carrier of the turning unit is transferred via linear guides directly from the support structure into the machine bed, i.e. the bars of the injection-molding machine are not subjected to loading, while in contrast that reaction torque that acts on the support structure during (positive and negative) rotational acceleration of the mold-half carrier by means of the mold-half-carrier rotary drive braced on the support structure is transferred selectively at least in the scope of a substantial part into bars, for which purpose the support structure is braced via bracing guides on bars. By the feature according to which the weight of the support structure and of the mold-half carrier of the turning unit is transferred via linear guides directly from the support structure into the machine bed, it can be understood that at least the greatly predominant portion of the weight forces in question are braced in the said manner directly on the machine bed, i.e. at least 90%. Secondary bracing, amounting to at most 10%, of the weight of the support structure and of the mold-half carrier of the turning unit on components of the injection-molding machine other than the machine bed, i.e. especially on bars of the injection-molding machine, do not oppose the achievement of the feature according to which "the weight of the support structure and of the hold-half carrier of the turning unit is transferred via linear guides directly from the support structure into the machine bed". The fact that, on the other hand, at least a substantial part of that reaction torque which is exerted on the support structure during rotational acceleration of the mold-half carrier by means of the mold-half-carrier rotary drive is transferred via bracing guides into at least one of the bars means a corresponding relief of the load on the linear guides supporting the weight of the support structure and of the mold-half carrier of the turning unit with respect to these reaction forces or torques. This results in several characteristic advantages, which can be achieved individually or in combination, depending on the constructive implementation of the present invention.

On the one hand, the fact that—viewed from opposite directions—the support structure stiffens the bars in question, on which they are braced via the said bracing guides, relative to one another, is in functional relationship with the said reaction-torque bracing, in any case when the reaction torques are transferred via two such bracing guides into two bars. This is in turn a particularly definitive aspect of technical importance for the inventive injection molding machine, according to which the end plate therein is braced on the machine bed such that it can be displaced along the machine axis and for this reason the bars cannot be immovably fixed at their two ends, i.e. both on the (fixed) nozzle plate and on the (movable) end plate. In particular, therefore—according to a preferred improvement of the invention—the bars of the injection-molding machine are (immovably) fixed (only) on their nozzle plate, but at the end plate of the injection-molding machine they are positionally secured in adjustable manner. This permits variation of the position of the end plate—braced directly on the machine bed such that it can be displaced along the machine axis—by means of a mold-height-adjusting device, which is used both for positioning the end plate in a position adapted to the respective mold and for positionally securing the bars on the end plate in their position in question. The present invention is quite especially advantageous in the case that the closing assembly is constructed as a toggle-lever closing assembly. Nevertheless, this in no way represents the sole constructive implementation of the present invention; to the contrary, it can also be employed with advantage with closing assemblies of other constructions.

Within the scope of the present invention, that reaction torque which is exerted on the support structure during rotational acceleration of the mold-half carrier is particularly preferably transferred not exclusively via the bracing guides explained in the foregoing into at least one of the bars, but instead is also transferred to a noteworthy extent directly into the machine bed. For this purpose, the linear guides, via which the weight of the support structure and of the mold-half carrier of the turning unit is transferred directly from the support structure into the machine bed, particularly preferably comprise the guide rails associated with the machine bed and the guide elements associated with the support structure, in which case the latter embrace the guide rails interlockingly or engage in the guide rails interlockingly. Because the transfer of the reaction torques occurring during rotational acceleration of the mold-half carrier into the machine structure is double in this sense, it is possible to achieve large rotational accelerations (in the sense of high dynamic machine capability) even for particularly heavy mold-half carriers (with mold halves clamped thereon), without causing static problems. By virtue of the bracing of the support structure on at least one of the bars for the purpose of transfer of at least a substantial part of the reaction torque exerted on the support structure via the said bracing guides into the bars in question, the reaction torque transferred or to be transferred from the support structure directly into the machine bed is reduced compared with such injection-molding machines in which the support structure is entirely uncoupled from the bars, thus in turn making it possible to shorten the axial overall length of the support structure or its axial bracing length on the guide rails. This may also prove to be advantageous for particular molds, since such a support structure with relatively short axial overall length allows a larger configuration margin with respect to the mold halves to be clamped on the nozzle plate as well as the movable mold-clamping plate. The said limitation of the reaction torque transferred or to be transferred from the support structure directly into the machine bed also makes it possible to dispose the linear guides used for bracing the weight of the support structure and of the mold-half carrier of the turning unit closer to the machine center than in the prior art. This advantage may be used in particular when, according to a preferred improvement—explained in more detail hereinafter—the movable mold-clamping plate and the turning unit are braced via different linear guides on the machine bed.

The reduction of the axial overall length of the support structure explained hereinabove, which incidentally may be combined with a weight savings and in this way —because of reduced moving masses—possibly permits a higher dynamic machine capacity, may be implemented to a particularly effective extent when the turning unit comprises an (upper) crossbeam structure, on which the mold-half carrier is mounted to rotate around the axis of rotation and which is braced if necessary via bracing guides on associated bars and/or on which at least one longitudinal positioning drive for the turning unit acts. By virtue of this supplementary feature explained in the foregoing, the tendency of the turning unit to tilt in longitudinal direction of the machine during acceleration or braking is significantly reduced, thus favoring a corresponding shortening of the support structure in axial direction without detrimental effects (see above).

According to yet another preferred improvement of the present invention, the support structure and the crossbeam structures may be part of a closed frame structure. Especially in this case, two longitudinal positioning drives, one of which acts on the support structure and the other on the crossbeam structure, are sufficient for adjusting the position of the turning unit in longitudinal direction of the machine, in which case the two longitudinal positioning drives are advantageously disposed such that they are diagonally offset relative to one another. However, a restriction to two longitudinal positioning drives—especially disposed in diagonal relationship—can also be achieved without making the support structure and the crossbeam structure part of a closed frame structure. In this case, it may well prove advantageous if a braking or blocking device, by means of which twisting of the mold-half carrier relative to the upper crossbeam structure is prevented, acts between the mold-half carrier and the upper crossbeam structure. Together with the blocked mold-half-carrier rotary drive acting between the lower support structure and the mold-half carrier, the turning unit in this case forms a torsionally stiff unit as a whole, i.e. comprising the lower support structure, the mold-half carrier and the upper crossbeam structure, and so the torques resulting from the eccentric transfer of longitudinal displacement forces into the lower support structure and the upper crossbeam structure are compensated or balanced out within the turning unit.

Incidentally, the longitudinal displacement drives explained in the foregoing may be synchronized in different ways, such as mechanically, hydraulically or electrically.

However, it is in no way imperative that that at least one longitudinal positioning drive, if one such is provided, act on the crossbeam structure. To the contrary, it is also entirely possible to provide that the at least one longitudinal positioning drive of the turning unit acts exclusively on the (lower) support structure.

Within the scope of the present invention, those linear guides via which the weight of the turning unit is transferred directly from the support structure into the machine bed may serve this purpose exclusively. In this case they may be constructed and positioned in a manner optimized specifically for their function. In particular, the linear guides may be disposed relatively close to the machine center, so that they transfer the weight of the support structure and of the mold-half carrier (together with the mold halves clamped thereon) optimally, i.e. with minimum bending load on the support structure, into the machine bed. This arrangement of the linear guides takes advantage of the circumstance that, in injection-molding machines with a turning unit, the space between the bars is not needed for the injection-molded products ejected from the die, because ejection can take place to the side—in a position of the mold-half carrier turned by 90°. This even makes it possible, with correspondingly positive effects on the costs, to achieve a common modular design of injection-molding machines with and without turning unit, by the fact that, when an injection-molding machine is equipped with a turning unit—without intervention into the bracing of the plates on the machine bed between the bars and the linear guides used for bracing the movable mold-clamping plates—an assembly is mounted on the machine bed together with the linear guides serving to brace the turning unit. Incidentally, the fact that the support structure is subjected to only minimum bending load, as explained hereinabove, permits a relatively lightweight design thereof; the fact that the weight of the support structure is reduced in this way favors a high dynamic machine capacity. Nevertheless, according to another implementation of the present invention, it is also conceivable that those linear guides via which the weight at least of the support structure and of the mold-half structure of the turning unit is transferred directly from the support structure into the machine bed can also serve other purposes, especially by the fact that the movable mold-clamping plate is also braced via those linear guides on the machine bed. In particular, guide elements, which are braced on guide rails identically to those of the guide elements associated with the support structure of the turning unit (see above), may be associated with the movable mold-clamping plate.

BRIEF DESCRIPTION OF THE DRAWINGS

The present invention will be explained in more detail hereinafter on the basis of a preferred exemplary embodiment illustrated in the drawing, wherein:

FIG. 1 shows a schematic side view of an injection-molding machine constructed according to the present invention, FIG. 1a shows a side view in enlarged detail of the part of the injection-molding machine according to FIG. 1 that is most important here, FIG. 2 shows a cross section through the injection-molding machine shown in FIG. 1A along line A-A, FIG. 3 shows an overhead view of detail X of FIG. 2, and FIG. 4 shows a modification of the injection-molding machine according to FIGS. 1a to 3 with illustration of a correspondingly modified cross section.

DETAILED DESCRIPTION OF THE PREFERRED EMBODIMENTS

The injection-molding machine shown in the drawing (only partly in FIG. 1a) is constructed in three-plate design. It comprises a machine bed 1, a (fixed) first mold-clamping plate 2 provided with a nozzle penetration (not illustrated), a second mold-clamping plate 3, which can be moved (arrow B) parallel to machine axis M and an end plate E—which in FIG. 1a is disposed at the left, in front of second mold-clamping plate 3. Four bars H fixed on the nozzle plate, namely two lower bars 4 and two upper bars 5, extend between first mold-clamping plate 2 (nozzle plate) and end plate E. Between second mold-clamping plate 3 and the end plate, a closing assembly S, which (as illustrated schematically in FIG. 1) may be constructed in particular as a toggle-level closing assembly, acts in a manner known in itself.

End plate E is braced directly on machine bed 1 such that it can be displaced along the machine axis. A mold-height-positioning device F is associated therewith. By means of this, the position of end plate E is adjustable and in the respective end-plate position bars H are positionally secured on end plate E in such a way that the reaction force that corresponds to the closing and holding force exerted on second mold-clamping plate 3 can be transferred from end plate E into bars H.

In such a known manner, (at least) one first injection unit SE1 is associated with nozzle plate 2 and (at least) one second injection unit SE2 is associated with mold-clamping plate 3. To simplify the diagram, the injection units are not also shown in FIG. 1a, since their construction and arrangement are not decisive in the present case.

A turning unit 6, which can be displaced (arrow C) parallel to machine axis M, is disposed between nozzle plate 2 and second mold-clamping plate 3. This comprises a lower support structure 7, an upper crossbeam structure 8 and a mold-half carrier 9 mounted on lower carrier structure 7 and upper crossbeam structure 8 to rotate around axis of rotation D perpendicular to machine axis M. A mold-half-carrier rotary drive is provided for the said rotation of mold-half carrier 9. For this, lower support structure 7 forms the abutment, in the sense that the reaction torques occurring during rotational acceleration (positive and negative rotational accelerations, i.e. including braking) of mold-half carrier 9 are first absorbed by lower support structure 7 and—as described hereinafter—are transferred from this at least partly into at least one lower bar 4. Incidentally, lower support structure 7 supports the weight of mold-half carrier 9 plus the mold halves respectively attached thereto. Meanwhile, the weight of upper crossbeam structure 8 is absorbed by upper bars 5, for which purpose upper crossbeam structure 8 is braced via bracing guides 10 at its ends on upper bars 5.

The weight of lower support structure 7, of mold-half carrier 9 and of the mold halves attached thereto is transferred via linear guides 11 directly from support structure 7 into machine bed 1. For this purpose, linear guides 11 comprise guide rails 12 associated with machine bed 1 and guide elements 13 associated with support structure 7. The latter embrace guide rails 12 interlockingly. In the injection-molding machine according to FIGS. 1 to 3, movable mold-clamping plate 3 is braced by means of guide elements 14 associated therewith on guide rails 12 identical to those of support structure 7 of turning unit 6. In contrast, in the modification according to FIG. 4, support structure 7 is braced by means of guide elements 13 associated therewith on the one hand and movable mold-clamping plate 3 is braced by means of guide elements 14 associated therewith on the other hand on different guide rails 12 and 15 respectively, wherein guide rails 12 serving as bracing for turning unit 6 are disposed between guide rails 15, on which movable mold-clamping plate 3 is braced. As regards the modification according to FIG. 4, it must also be further pointed out that a special assembly 22, which comprises a plate 23 with guide rails 12 mounted thereon, is provided for the bracing of turning unit 6. Assembly 22 rests on shoulders 24 of machine bed 1. Assembly 22 is omitted in injection-molding machines of otherwise identical design without turning unit 6.

For bracing of lower support structure 7 of turning unit 6 on one of the lower bars 5, in order to transfer at least a substantial part of the reaction torque exerted during rotational acceleration of mold-half carrier 9 on support structure 7 into the lower bar 5 in question, a bracing guide 16 is used. This comprises a two-piece guide member 17, which is attached vertically on lower support structure 7, i.e. it can be displaced parallel to axis of rotation D (arrow V), and is equipped with half-shell sliding bearings. Thus the transfer of the weight forces of lower support structure 7, of mold-half carrier 9 and of the mold halves attached thereto into machine bed 1 as described in the foregoing is assured without hereby loading lower bars 5, while at the same time at least a substantial part of the reaction torques occurring during rotational acceleration of mold-half carrier 9 are transferred into at least one lower bar 5. A modification of the illustrated injection-molding machine to the effect that support structure 7 is coupled with both lower bars 5 via the illustrated bracing guides 16 is possible with the advantages described hereinabove.

Shifting (arrow C) of turning unit 6 along machine axis M is provided by two longitudinal positioning drives 18, 19. In this connection, a lower longitudinal positioning drive 18 acts via an associated stop plate 20 on support structure 7 and an upper longitudinal positioning drive 19 acts via an associated stop plate 21 on crossbeam structure 8.

What is claimed is:

1. An injection-molding machine in three-plate design with a machine bed (1), a first mold-clamping plate (2), which is provided with a nozzle penetration and with which a first injection unit (SE 1) is associated, an end plate (E), a second mold-clamping plate (3), which can be moved parallel to a machine axis (M), is braced via a closing assembly (S) against the end plate (E) and with which a second injection unit (SE2) is associated, a plurality of bars (H) extending between the first mold-clamping plate (2) and the end plate (E), and a turning unit (6), which comprises a mold-half carrier (9) and is disposed between the first mold-clamping plate (2) and the second mold-clamping plate (3), wherein the end plate (E) is braced on the machine bed (1) such that it can be displaced along the machine axis (M) and the mold-half carrier (9) is mounted on a support structure (7) to rotate around an axis of rotation (D) oriented transversely relative to the machine axis (M), the said support structure forming an abutment for a mold-half-carrier rotary drive, wherein the weight of the support structure (7) and of the mold-half carrier (9) of the turning unit (6) is transferred via linear guides (11) directly from the support structure (7) into the machine bed (1) and at least a substantial part of a reaction torque exerted on the support structure (7) during rotational acceleration of the mold-half carrier (9) is transferred via at least one bracing guide (16) into at least one of the bars (H), wherein the linear guides comprise guide rails associated with the machine bed and guide elements associated with the support structure, and wherein the guide elements embrace the guide rails interlockingly.

2. The injection molding machine of claim 1, wherein the bars (H) are fixed on the first mold clamping plate (2) and at the end plate are positionally secured in adjustable manner by means of a mold-height positioning device.

3. The injection molding machine of claim 1, wherein the second mold-clamping plate (3) is braced by means of guide elements (14) associated therewith on guide rails (12) identical to those guides elements associated with the support structure (7) of the turning unit (6).

4. The injection molding machine of claim 1, wherein the second mold-clamping plate (3) is braced by means of guide elements (14) associated therewith on separate guide rails (15), which are not identical to those guide rails (12) on which the support structure (7) of the turning unit (6) is braced.

5. The injection molding machine of claim 1, wherein the turning unit (6) comprises an upper crossbeam structure (8), on which the mold-half carrier (9) is mounted to rotate around the axis of rotation (D).

6. The injection molding machine of claim 5, wherein the support structure (7) and the crossbeam structure (8) are part of a closed frame structure.

7. The injection molding machine of claim 5, wherein the crossbeam structure (8) is braced via bracing guides (10) on the bars (H).

8. The injection molding machine of claim 5, wherein longitudinal positioning drives (18, 19) act on each of the support structure (7) and on the crossbeam structure (8) by way of associated stop plates.

9. The injection molding machine of claim 1, wherein longitudinal positioning drives act exclusively on the support structure (7) by way of a stop plate.

10. The injection molding machine of claim 1, wherein the closing assembly is constructed as a toggle-lever closing assembly.

11. The injection molding machine of claim 1, wherein the closing assembly is of hydraulic construction.

* * * * *